(12) United States Patent
Kasuya

(10) Patent No.: US 6,425,649 B2
(45) Date of Patent: Jul. 30, 2002

(54) IN-FLIGHT MEAL SERVICE CART

(75) Inventor: Toshihisa Kasuya, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 09/765,441

(22) Filed: Jan. 22, 2001

(30) Foreign Application Priority Data

Jan. 26, 2000 (JP) ...................................... 2000-017208

(51) Int. Cl.[7] .............................................. B65D 65/02
(52) U.S. Cl. ...................................... 312/409; 150/154
(58) Field of Search ...................... 312/4, 249.8, 352, 312/204, 401, 400, 409, 234, 265.6; 150/158, 154

(56) References Cited

U.S. PATENT DOCUMENTS

| | | | |
|---|---|---|---|
| 3,870,594 A | * | 3/1975 | Kudo |
| 4,244,411 A | | 1/1981 | Karkstroem et al. |
| RE30,623 E | * | 5/1981 | Schulz et al. |
| 4,614,091 A | * | 9/1986 | Frank et al. |
| 4,954,384 A | * | 9/1990 | Hartwell ................. 150/154 X |
| 4,960,302 A | | 10/1990 | Walters |
| 4,973,109 A | * | 11/1990 | Diedrich ............... 312/265.6 X |
| 5,454,492 A | * | 10/1995 | Hunter et al. ........... 150/154 X |
| 5,509,225 A | * | 4/1996 | Minh et al. |
| 5,655,824 A | * | 8/1997 | DeCosse ................. 312/352 X |
| 6,189,700 B1 | * | 2/2001 | Packrall et al. ......... 150/154 X |

FOREIGN PATENT DOCUMENTS

| | | |
|---|---|---|
| EP | 0 922 413 | 6/1999 |
| NL | 1 002 515 | 9/1997 |

* cited by examiner

*Primary Examiner*—Janet M. Wilkens
(74) *Attorney, Agent, or Firm*—Armstrong, Westerman & Hattori, LLP

(57) ABSTRACT

An in-flight meal service cart for an aircraft equipped with a box-shaped main body composed of a fireproof material, a plurality of connecting members provided to at least both outer side walls surfaces of the main body, and a cover body composed of cloth for covering at least both side wall surfaces and an upper surface of the box-shaped main body. The cover body is detachable from the main body and is detached from the main body of the meal server, at least during takeoff and landing of an aircraft, so that a fireproof material is exposed as outer wall surfaces. The cover body is a cloth provided at the surface thereof with an advertising function portion for indicating advertising graphic, or advertising phrases.

3 Claims, 4 Drawing Sheets

A plurality of connecting means 110 consisting of planted
IN-FLIGHT MEAL SERVICE CART

FIELD OF THE INVENTION

The present invention relates to a meal service cart used in an aircraft.

DESCRIPTION OF THE RELATED ART

The meal service for passengers in an aircraft is provided using a meal service cart. During the service, the meal service cart passes through a narrow passenger aisle, so that outer walls of the meal service cart were liable to be damaged from colliding with the passenger seats or other interior decorations, or get its side walls scraped. Also, the outer walls were badly stained from soups or other watery dishes during providing of the meal service.

Generally, there are defined requirements that the outer walls of the interior decorations in an aircraft must be made from fireproof materials. Moreover, for aircrafts carrying passengers of 20 or more, it is defined in a flightworty examination procedure that a special material satisfying a strict fireproof requisite must be used for the faces of linings for ceilings and side walls, and of outer shell of lavatories and the like that are exposed to inner side of a cabin at least during takeoff and landing. As one of the requirements in this special requirement regulation, there is provided a combustion characteristic in order to prevent occurrence of fire in case of an airplane crash and the like.

This is a regulation concerning limits on peak heat value and total heat value when heat energy is applied to a material. Under this regulation, the peak heat value must be 65 Kw/m$^2$ or less, and total heat value must be 65 Kw·min/m$^2$ or less.

This regulation is also applied to the outer walls of a meal service cart, so that the outer walls of a meal service cart were formed from a special fireproof material satisfying the strict requisite concerning limitation on peak heat value and total heat value. The repair or reform of the outer walls of the meal service cart made of such special fireproof material was expensive, and also the cleaning thereof was troublesome.

SUMMARY OF THE INVENTION

The present invention aims to prevent damage or stain of the outer walls made of special fireproof material as well as to ease cleaning while satisfying the fireproof regulations on flightworthiness, by mounting a detachable cover to a meal service cart during operation such as providing of the meal service and the like.

The in-flight meal service cart of the present invention is equipped with a box-shaped main body composed of a special fireproof material, a plurality of connecting means provided to at least both outer side wall surfaces of the main body, and a cover body composed of cloth for covering at least both side wall surfaces and upper surface of the box-shaped main body, and the cover body is constituted detachably from said main body. And, the cover body is detached from said main body of the meal service cart at least during takeoff and landing of an aircraft, so that a special fireproof material is exposed as outer wall surfaces of the box-shaped main body.

Moreover, the cover body is provided at the surface thereof with an advertising function portion for indicating advertising graphics, or advertising phrases, or is constituted so as to be washable.

DETAILED DESCRIPTION OF PREFERRED EMBODIMENTS

The mode for carrying out the present invention will be explained below with reference to the drawings.

Figure 1:
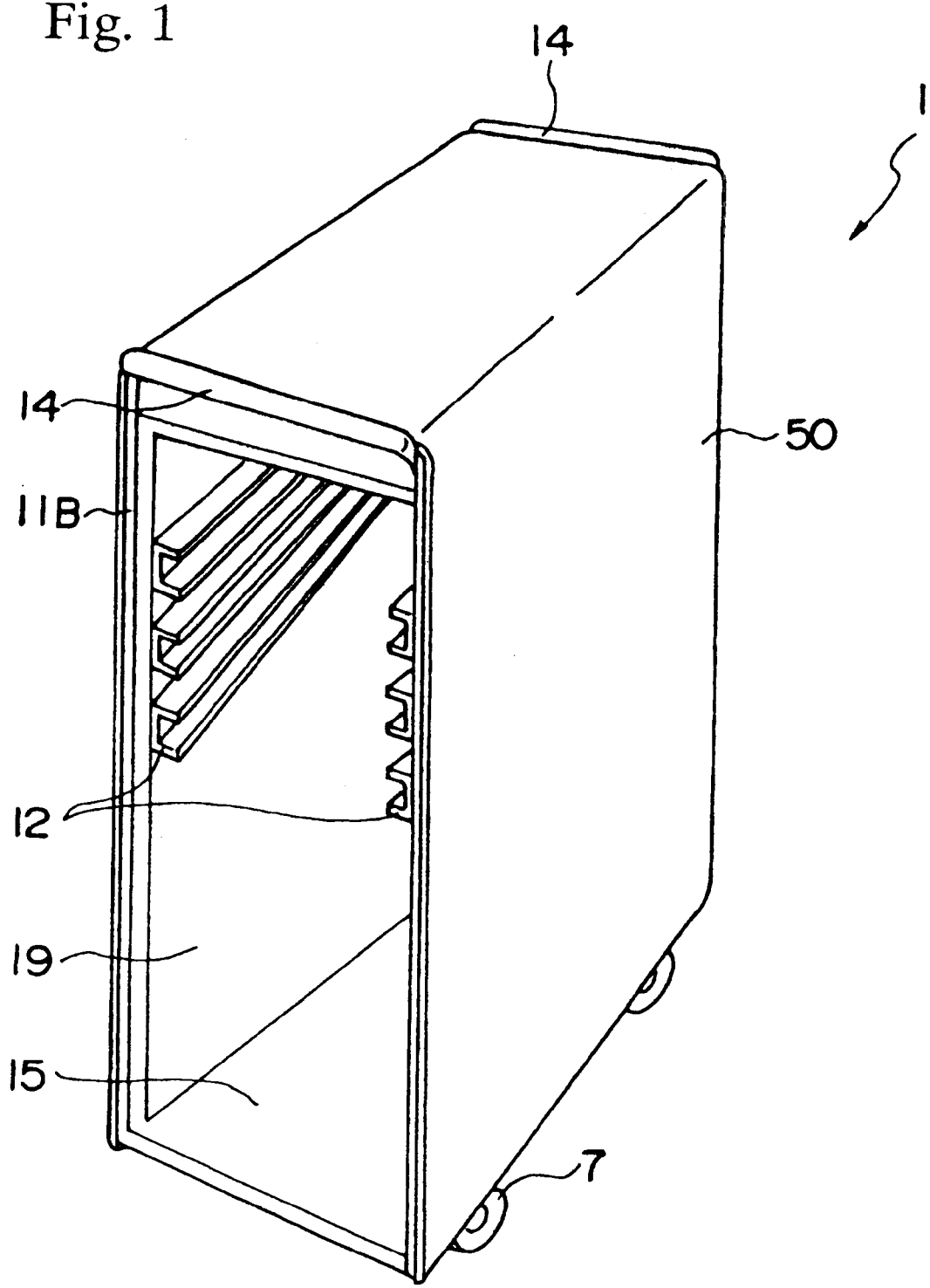
FIG. 1 is a perspective view of a meal service cart according to the present invention.
Figure 2:
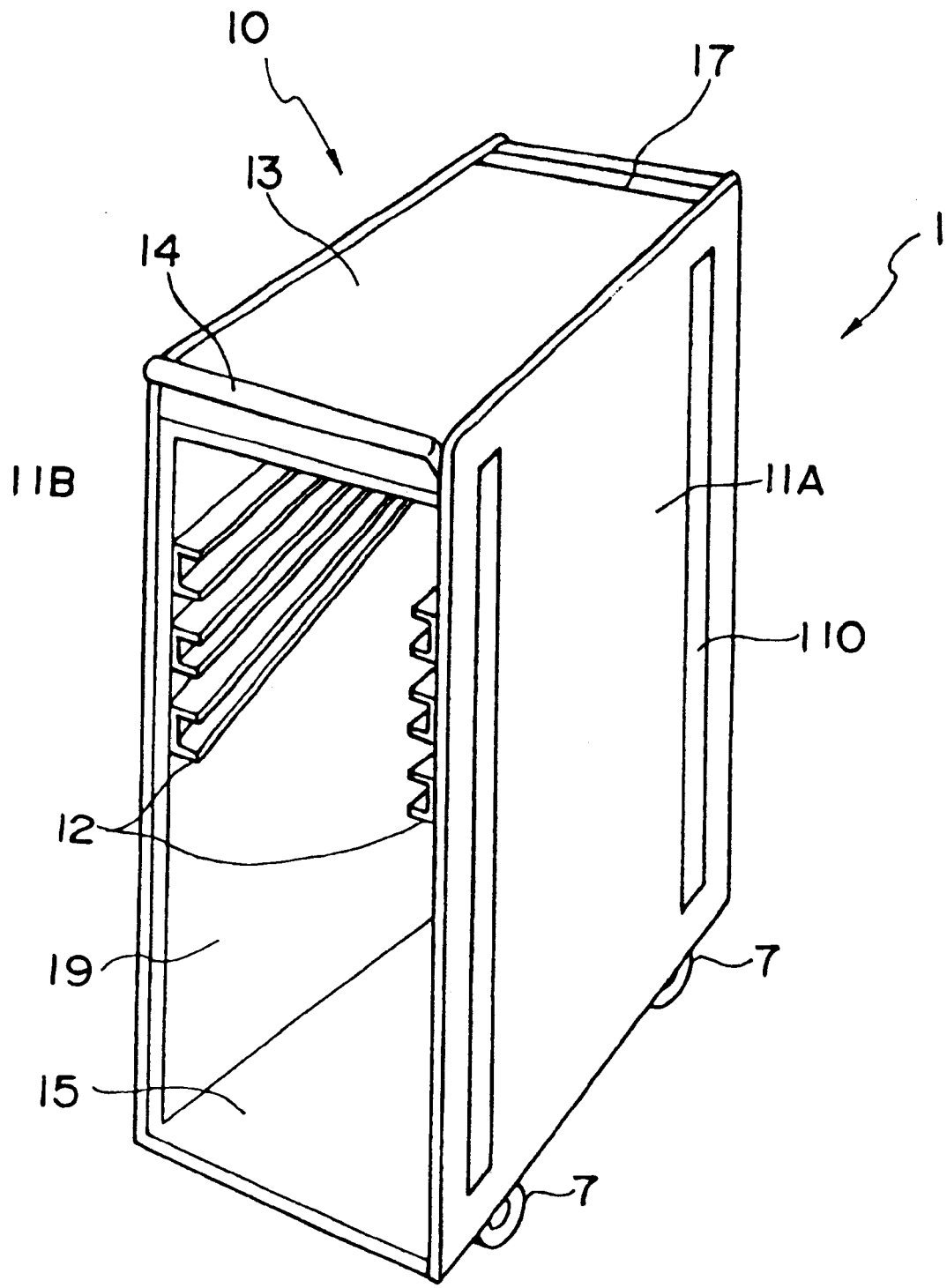
FIG. 2 is an overall explanatory view of a meal service cart with a cover body taken off.
Figure 3:
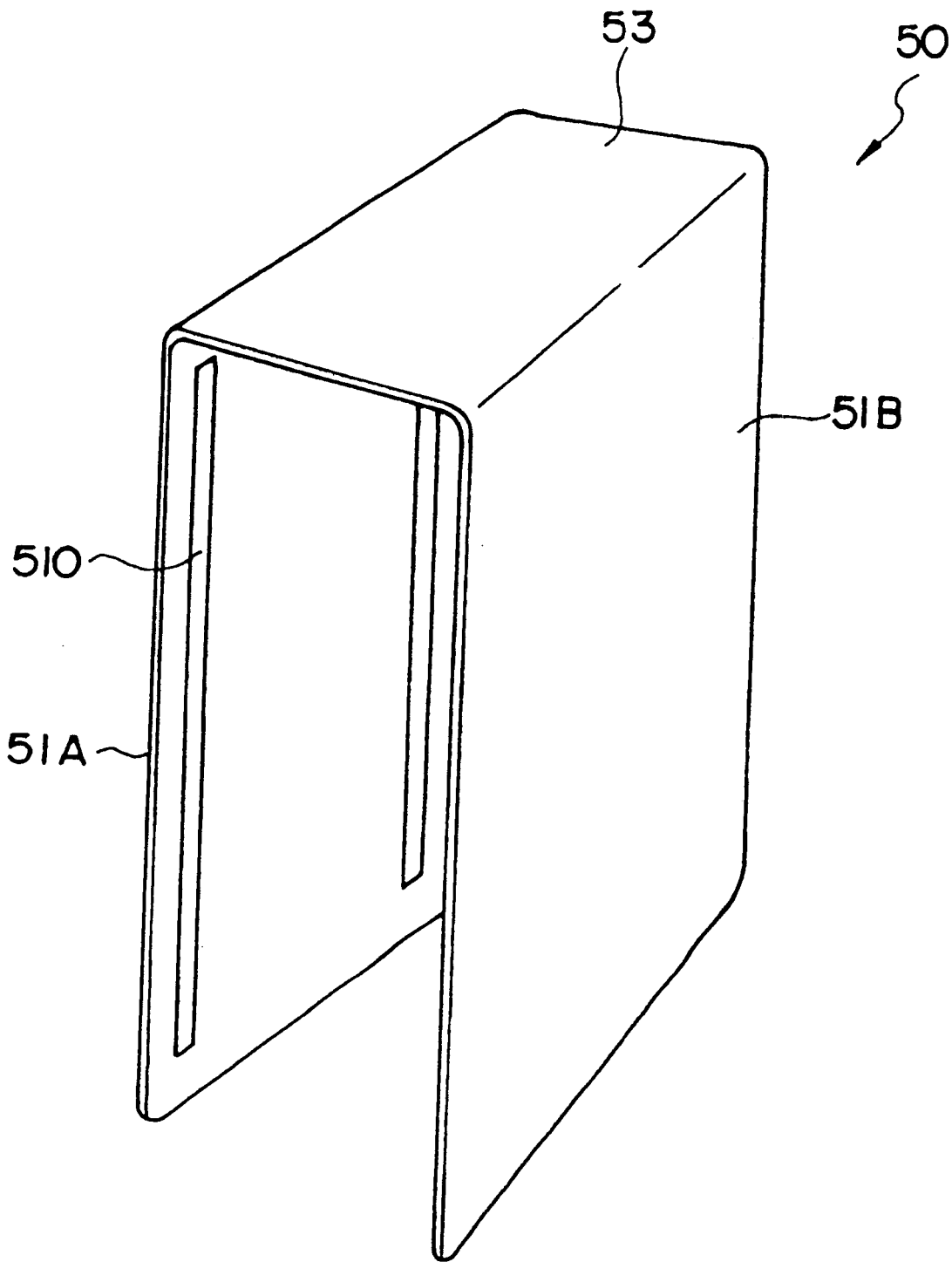
FIG. 3 is a perspective view of a cover body.

FIG. 1 is a perspective view of a meal service cart according to the present invention, FIG. 2 is a perspective view of a meal service cart with a cover body taken off, and FIG. 3 is a perspective view of a cover body.

The meal service cart 1 is equipped with a box-shaped meal service cart main body 10 configuring cross-sectionally U-shape by assembling both side wall boards 11A and 11B, a ceiling board 13, a bottom board 15, and a rear board 17, and leaving a front surface 19 open, and a plurality of wheels 7 provided to the bottom board 15 for moving the meal service cart main body 10. Also, a handle 14 for operation is provided to the upper surface of the ceiling board 13.

The meal service cart main body 10 is provided with a plurality of storage shelves 12 in parallel to the bottom board 15 for storing trays to the inner wall surfaces of the both side wall boards 11A and 11B.

The both side wall boards 11A and 11B, the ceiling board 13, the rear board 17, and the bottom board 15 are formed from, at least at the outer surfaces thereof, with a special fireproof material satisfying the requisites regulated in flightworthy examination procedure (hereinafter referred to as a special fireproof material), such as a composite material using phenol resin (honeycomb panel) or the like.

The meal service cart 1 shown in the present example has no decorative wallpaper provided to the surface of the special fireproof material, which is normally provided to the outer walls in meal service carts, so that the special fireproof material is exposed.

A plurality of connecting means 110 consisting of planted loops is provided to the surface of the special fireproof material of both side wall boards 11A and 11B of the main body 10 of the meal service cart 1.

The meal service cart 1 is equipped with a detachable cover body 50.

The cover body 50 has side wall cover bodies 51A and 51B, and an upper surface portion 53 connecting the upper portions of the side wall cover bodies 51A and 51B. The inner surfaces of the side wall cover bodies 51A and 51B, that is, the surface facing the meal service cart 1, are provided with a plurality of connector means 510 corresponding to the connecting means 110 provided to the main body 10, such as a connector means consisting of planted hooks. The upper surface portion 53 is constituted so as not to interfere with the handle 14 (refer to FIG. 1).

The cover body 50 is composed of cloth, and is washable.

The meal service cart 1 thus composed has the cover body 50 equipped to the meal service cart main body 10 during operation such as providing meal service through aisles inside an aircraft, by connecting the connecting means 110 of the side walls 11A and 11B of the main body 10 of the meal service cart 1 with the connector means 510 of the cover body 50.

In this case, the front surface portion 19 of the meal service cart 1 being the takeout portion of the tray is opened, so that the cover body 50 has no bad influence on meal serving operation.

Needless to say, the cover body 50 may be construed so as to cover the rear wall surface 17 of the meal service cart main body 10 also.

The meal service cart 1 thus composed has its outer wall surface exposing the special fireproof material protected by the cover body 50 during operation, so that even when the main body 10 collides against the passenger seats, interior decorations or the like, the outer wall surface formed from the special fireproof material will not be damaged. Also, stains from soups or other watery dishes and the like are absorbed by the cover body 50 made of cloth, so that it does not stain the outer walls made of the special fireproof material of the main body 10.

After the service is finished, the cover body 50 is taken off from the main body 10, and is folded and stored inside the storage space. Then, the cover body 50 is washed along with used tablecloth for passenger seats and the like, and is used repeatedly.

The meal service cart 1 composed of the special fireproof material is located inside the galley equipment with the cover body 50 taken off, when the regulations under the flightworthy examination procedure is effective, such as during takeoff and landing. During the meal service, the cover body 50 stored in the storage space together with the tablecloth for passenger seats and the like is equipped to the meal service cart main body 10. The meal service cart 1 is used with the special fireproof material covered, so that damage or stain of the outer walls of the meal service cart could be moderated, and repair and cleaning of the meal service cart could be decreased.

Moreover, the meal service cart 1 has the composition of exposing the special fireproof material side, and has no decorative wallpaper provided to the wall surfaces, so that expenses needed for exchange of decorative wall paper, repair of damaged portions, and re-covering the wallpaper could be reduced.

Figure 4:
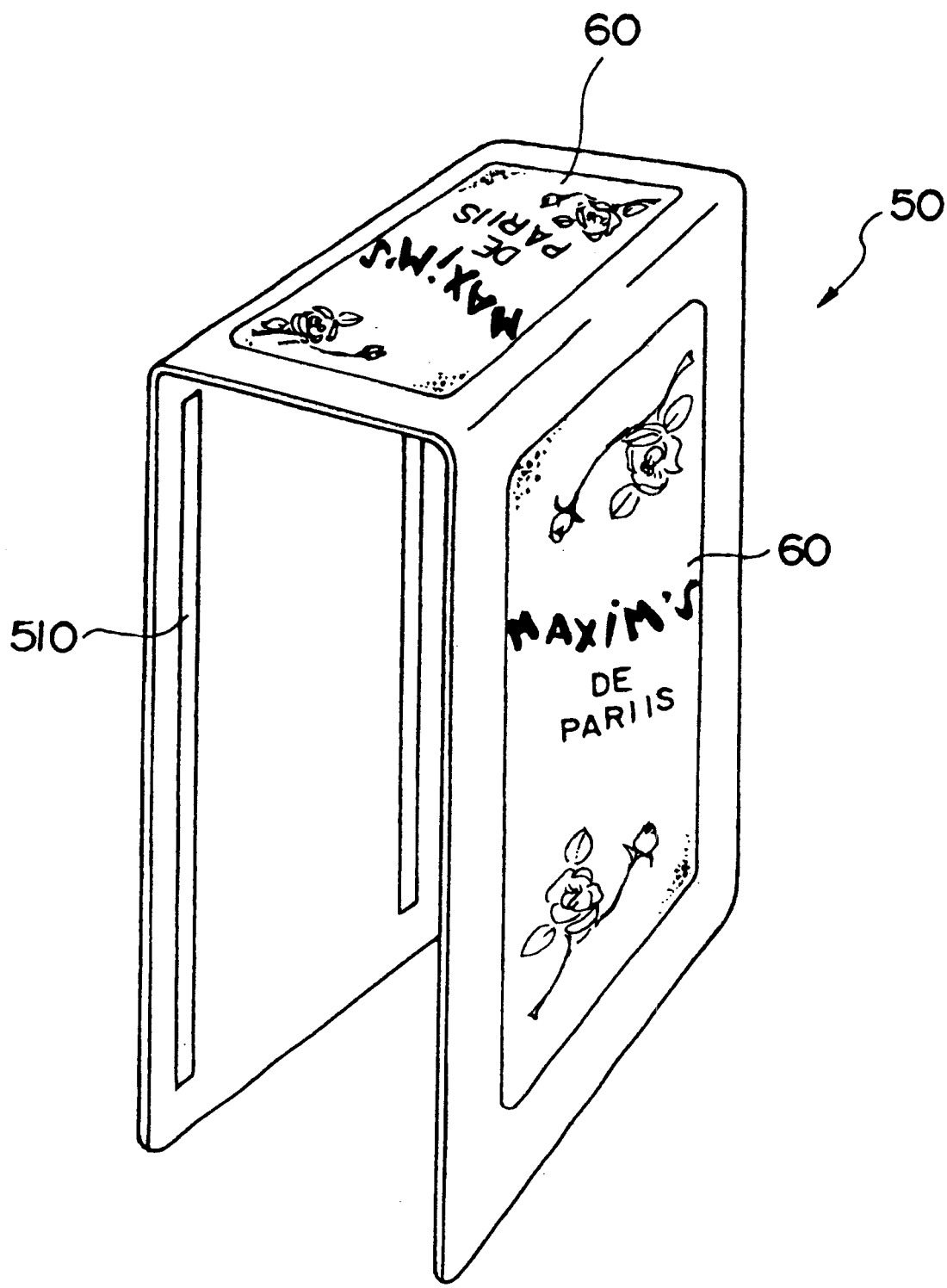
FIG. 4 is a perspective view indicating another example of a cover body.

As is shown in FIG. 4, the cover body 50 could be provided with an advertising means 60, such as advertisement function portion 60 indicating an advertising phrases, graphics or the like, in order to improve decorating and advertising effect.

Particularly, by providing the advertising phrases and graphics relating to the goods handled in the in-flight sales, further improvement in advertising effect could be achieved.

The meal service cart of the present invention could reduce the maintenance operation and maintenance expenses while satisfying the regulations of flightworthy examination procedure of an aircraft.

Also, it could be provided with an advertisement function.

I claim:

1. An in-flight meal service cart for an aircraft, comprising:
   a box-shaped main body composed of a fireproof material;
   a plurality of connecting means provided to at least both outer side wall surfaces of said main body; and
   a cover body for covering at least both side wall surfaces and an upper surface of said box-shaped main body: wherein
   said cover body is composed of cloth, is provided with a plurality of connector means for connecting with the connecting means of said main body, and is detachable from said main body; and
   said cover body is repeatably easily detachable from said main body of the meal service cart by a user of the cart at least during takeoff and landing of the aircraft, so that the fireproof material is exposed as outer wall surfaces of the box-shaped main body and said cover body is repeatably easily attachable to said main body of the meal service cart by the user of the cart.

2. An in-flight meal service cart according to claim 1, wherein an advertising function portion is provided to the surface of said cover body.

3. An in-flight meal service cart according to claim 1, wherein the cloth constituting said cover body is washable.

* * * * *